(12) United States Patent
Baumann et al.

(10) Patent No.: US 7,428,091 B2
(45) Date of Patent: Sep. 23, 2008

(54) ELECTROCHROMIC COMPOUNDS AND ASSOCIATED MEDIA AND DEVICES

(75) Inventors: Kelvin L. Baumann, Holland, MI (US); Thomas F. Guarr, Holland, MI (US); Punam Giri, Holland, MI (US); Mark D. Muyskens, Holland, MI (US); Sue F. Franz, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 69 days.

(21) Appl. No.: 11/272,552

(22) Filed: Nov. 10, 2005

(65) Prior Publication Data

US 2006/0103911 A1  May 18, 2006

Related U.S. Application Data

(60) Provisional application No. 60/627,875, filed on Nov. 15, 2004.

(51) Int. Cl.
G02F 1/15 (2006.01)

(52) U.S. Cl. ..................................................... 359/265

(58) Field of Classification Search ......... 359/265–275, 359/296; 544/347; 345/49, 105, 107; 348/817
See application file for complete search history.

(56) References Cited

U.S. PATENT DOCUMENTS

| 4,902,108 | A | 2/1990 | Byker |
| 5,928,572 | A | 7/1999 | Tonar et al. |
| 5,940,201 | A | 8/1999 | Ash et al. |
| 6,020,987 | A | 2/2000 | Baumann et al. |
| 6,064,509 | A | 5/2000 | Tonar et al. |
| 6,137,620 | A | 10/2000 | Guarr et al. |
| 6,188,505 | B1 | 2/2001 | Lomprey et al. |
| 6,193,378 | B1 | 2/2001 | Tonar et al. |
| 6,193,912 | B1 | 2/2001 | Theiste et al. |
| 6,195,192 | B1 | 2/2001 | Baumann et al. |
| 6,249,369 | B1 | 6/2001 | Theiste et al. |
| 6,262,832 | B1 | 7/2001 | Lomprey et al. |
| 6,445,486 | B1 | 9/2002 | Lomprey et al. |
| 6,496,294 | B2 | 12/2002 | Lomprey et al. |
| 6,710,906 | B2 | 3/2004 | Guarr et al. |
| 6,778,311 | B2 | 8/2004 | Roberts et al. |
| 6,783,099 | B2 | 8/2004 | Rukavina et al. |
| 6,842,276 | B2 | 1/2005 | Poll et al. |
| 2002/0141032 | A1* | 10/2002 | Guarr et al. ................. 359/265 |
| 2006/0056003 | A1* | 3/2006 | Tonar et al. ................. 359/265 |

* cited by examiner

Primary Examiner—Ricky Mack
Assistant Examiner—Tuyen Q Tra
(74) Attorney, Agent, or Firm—King & Partners, PLC

(57) ABSTRACT

An electrochromic device having an electrochromic medium comprising: a material represented by the following formula:

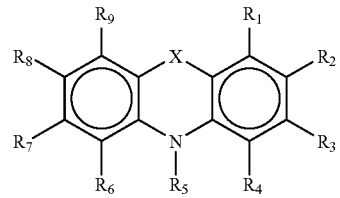

wherein X comprises N—$R_{10}$, O, or S; wherein $R_1$-$R_{10}$ are defined herein with the proviso that at least one of $R_5$ and $R_{10}$ comprises an alkyl, cycloalkyl, polycycloalkyl, heterocycloalkyl, aryl, alkaryl, aralkyl, alkoxy, alkenyl, and/or alkynyl group containing 4 to approximately 50 carbon atoms, wherein at least one of the carbon atoms may be a linking group to, or part of, a halogen, a N, O, and/or S containing moiety, and/or one or more functional groups comprising alcohols, esters, ammonium salts, phosphonium salts, and combinations thereof, and wherein at least one of $R_5$ and $R_{10}$ is void of any β hydrogen atoms.

25 Claims, 1 Drawing Sheet

ELECTROCHROMIC COMPOUNDS AND ASSOCIATED MEDIA AND DEVICES

CROSS-REFERENCE TO RELATED APPLICATION(S)

This application claims the benefit of U.S. Provisional Application Ser. No. 60/627,875, filed Nov. 15, 2004, which is hereby incorporated herein by reference in its entirety.

BACKGROUND OF THE INVENTION

1. Field of the Invention

The present invention relates in general to compounds for use in electrochromic (EC) devices and, more particularly, to anodic compounds including substituted 5,10-dihydrophenazine compounds and associated derivatives thereof which are useful in solution phase EC devices.

2. Background Art

Variable transmittance light filters, such as electrochromic light filters, have been proposed for use in architectural windows and skylights, as well as in windows and sunroofs for automobiles—just to name a few. Such electrochromic light filters reduce the transmittance of direct or reflected sunlight during daytime through the window, while not reducing such transmittance during nighttime. Not only do the above-identified electrochromic light filters reduce bothersome glare and ambient brightness, but they also reduce fading of interior materials and heat load caused by the transmittance of sunlight through a window. In addition, electrochromic mirrors have become popular in the automotive industry for reducing glare from the headlamps of following cars during nighttime driving.

Solution phase electrochromic devices are well known in the art. See, for example, U.S. Pat. No. 4,902,108 entitled "SINGLE-COMPARTMENT, SELF-ERASING, SOLUTION-PHASE ELECTROCHROMIC DEVICES, SOLUTIONS FOR USE THEREIN, AND USES THEREOF," which is hereby incorporated herein by reference in its entirety—including the references cited therein. In solution phase electrochromic devices, 5,10-dimethyl-5,10-dihydrophenazine (sometimes referred to herein as "DMP") is commonly used as an anodic material. The use of DMP (a good electron donor/anodic material) in a solvent with a 4,4'-bipyridinium compound (a viologen), such as 1,1'-dioctyl-4,4'-bipyridinium bis(tetrafluoroborate) (a good electron acceptor/cathodic material), leads to the formation of a charge transfer band that exhibits a broad absorbance near 800 nanometers (nm). Preferably, the presence of such a charge transfer complex, and associated absorbance, would be eliminated or at least substantially reduced for numerous performance and/or stability reasons. Other anodic materials have been discussed in the art. See, for example, U.S. Pat. No. 6,020,987 entitled "ELECTROCHROMIC MEDIUM CAPABLE OF PRODUCING A PRE-SELECTED COLOR," which is hereby incorporated herein by reference in its entirety—including the references cited therein. While the '987 patent discloses compounds which exhibit reduced charge transfer band absorbance with a viologen in solution, such as 5,10-diisopropyl-5,10-dihydrophenazine, to the best of Applicant's knowledge none of the compounds disclosed in the '987 patent have replaced DMP as the preferred anodic compound for use in solution phase electrochromic devices.

SUMMARY OF THE INVENTION

Accordingly, an aspect of the present invention is to provide anodic electrochromic materials with a reduced charge transfer band absorbance, and further to provide anodic materials that lead to EC devices, such as mirrors and windows, with enhanced stability. In one embodiment of the present invention, substituted 5,10-dihydrophenazine compounds are disclosed which comprise branched alkyl chains attached at the 5 and 10 positions (i.e. the N atoms) wherein the substituent group(s) are void of any $\beta$ hydrogen atoms.

Indeed, it has been surprisingly discovered that the branched alkyl chains lead to reduced charge transfer complex formation, and the elimination of the $\beta$ hydrogen atoms on a substituent group leads to enhanced stability of devices which utilize these compounds as the anodic components.

In this embodiment, at least one branched alkyl group of the form PN—CXX'—CRR'R" is included, wherein the PN represents the nitrogen atom at the 5 and/or 10 position of the phenazine ring, X and X' are the same or different and comprise H, an alkyl, cycloalkyl, polycycloalkyl, heterocycloalkyl, aryl, alkaryl, aralkyl, alkoxy, alkenyl, and/or alkynyl group containing approximately 1 to approximately 50 carbon atom(s) (e.g. an alkyl chain of approximately 1 to approximately 10 carbon atom(s)), which can optionally include a halogen, a N, O, and/or S containing moiety, and/or one or more functional groups comprising alcohols, esters, ammonium salts, phosphonium salts, and combinations thereof, and R, R' and R" are the same or different and comprise, an alkyl, cycloalkyl, polycycloalkyl, heterocycloalkyl, aryl, alkaryl, aralkyl, alkoxy, alkenyl, and/or alkynyl group containing approximately 1 to approximately 50 carbon atom(s) (e.g. an alkyl chain of approximately 1 to approximately 10 carbon atom(s)), which can optionally include a halogen, a N, O, and/or S containing moiety, and/or one or more functional groups comprising alcohols, esters, ammonium salts, phosphonium salts, and combinations thereof. In accordance with the present invention, any one of X, X', R, R', and/or R" may be associated with a solubilizing moiety as is taught and disclosed in U.S. Pat. No. 6,262,832 entitled "ANODIC ELECTROCHROMIC MATERIALS HAVING A SOLUBILIZING MOIETY" and U.S. Pat. No. 6,445,486 entitled "ELECTROACTIVE MATERIALS AND BENEFICIAL AGENTS HAVING A SOLUBILIZING MOIETY;" and/or a diffusion coefficient controlling moiety as is taught in U.S. Pat. No. 6,710,906 entitled "CONTROLLED DIFFUSION COEFFICIENT ELECTROCHROMIC MATERIALS FOR USE IN ELECTROCHROMIC MEDIUMS AND ASSOCIATED ELECTROCHROMIC DEVICES," all of which are incorporated herein by reference in their entirety—including the references cited therein. In one embodiment of the present invention, a branched alkyl group attached to the phenazine will preferably comprise approximately 5 to approximately 50 carbon atoms, and more preferably approximately 5 to approximately 20 carbon atoms.

The present invention is also directed to an electrochromic medium for use in an electrochromic device comprising: (a) at least one solvent; (b) at least one anodic electroactive material; (c) at least one cathodic electroactive material, wherein at least one of the anodic and cathodic electroactive materials is electrochromic; and (d) wherein at least one anodic electroactive material is represented by the following formula:

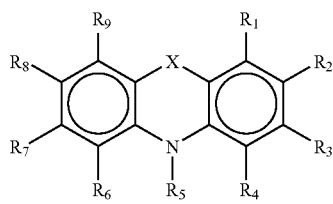

wherein X comprises N—R$_{10}$, O, or S; wherein R$_1$-R$_{10}$ are the same or different and comprise H, an alkyl, cycloalkyl, polycycloalkyl, heterocycloalkyl, aryl, alkaryl, aralkyl, alkoxy, alkenyl, and/or alkynyl group containing approximately 1 to approximately 50 carbon atom(s) and/or a silyl or siloxyl group containing approximately 1 to approximately 50 silicon atom(s), wherein the carbon and/or silicon atom(s) may be a linking group to, or part of, a halogen, a N, O, and/or S containing moiety, and/or one or more functional groups comprising alcohols, esters, ammonium salts, phosphonium salts, and combinations thereof; with the proviso that at least one of R$_5$ and R$_{10}$ comprises an alkyl, cycloalkyl, polycycloalkyl, heterocycloalkyl, aryl, alkaryl, aralkyl, alkoxy, alkenyl, and/or alkynyl group containing 4 to approximately 50 carbon atoms, wherein at least one of the carbon atoms may be a linking group to, or part of, a halogen, a N, O, and/or S containing moiety, and/or one or more functional groups comprising alcohols, esters, ammonium salts, phosphonium salts, and combinations thereof, and wherein at least one of R$_5$ and R$_{10}$ is void of any β hydrogen atoms.

In a preferred embodiment of the present invention, both R$_5$ and R$_{10}$ comprise an alkyl, cycloalkyl, polycycloalkyl, heterocycloalkyl, aryl, alkaryl, aralkyl, alkoxy, alkenyl, and/or alkynyl group containing 4 to approximately 50 carbon atoms, wherein at least one of the carbon atoms may be a linking group to, or part of, a halogen, a N, O, and/or S containing moiety, and/or one or more functional groups comprising alcohols, esters, ammonium salts, phosphonium salts, and combinations thereof, and wherein both of R$_5$ and R$_{10}$ are void of any β hydrogen atoms. In this embodiment, at least one of R$_5$ and R$_{10}$ may comprise an alkyl group containing approximately 5 to approximately 20 carbon atoms, such as a neopentyl group.

In another preferred embodiment of the present invention, the EC medium further comprises at least one of a cross-linked polymer matrix, a free-standing gel, and a substantially non-weeping gel.

The present invention is also directed to an EC device comprising: (a) at least one substrate having an electrically conductive material associated therewith; and (b) an electrochromic medium as disclosed herein.

The present invention is further directed to an EC device comprising: (a) a first substantially transparent substrate having an electrically conductive material associated therewith; (b) a second substrate having an electrically conductive material associated therewith; and (c) an electrochromic medium as disclosed herein.

In accordance with the present invention, the electrochromic device may comprise a window, a mirror, etcetera, and may include a perimeter metallic ring as well as a self-cleaning, hydrophilic coating.

Preferably, such an electrochromic device fabricated in accordance with the present invention exhibits a reduced charge transfer band in a solution with a viologen compared to 5,10-dimethyl-5,10-dihydrophenazine.

These and other features, advantages, and objects of the present invention will be further understood and appreciated by those skilled in the art by reference to the following specification, claims, and appended drawings.

BRIEF DESCRIPTION OF THE DRAWINGS

The invention will now be described with reference to the drawings wherein.

DETAILED DESCRIPTION OF THE INVENTION

Figure 1:
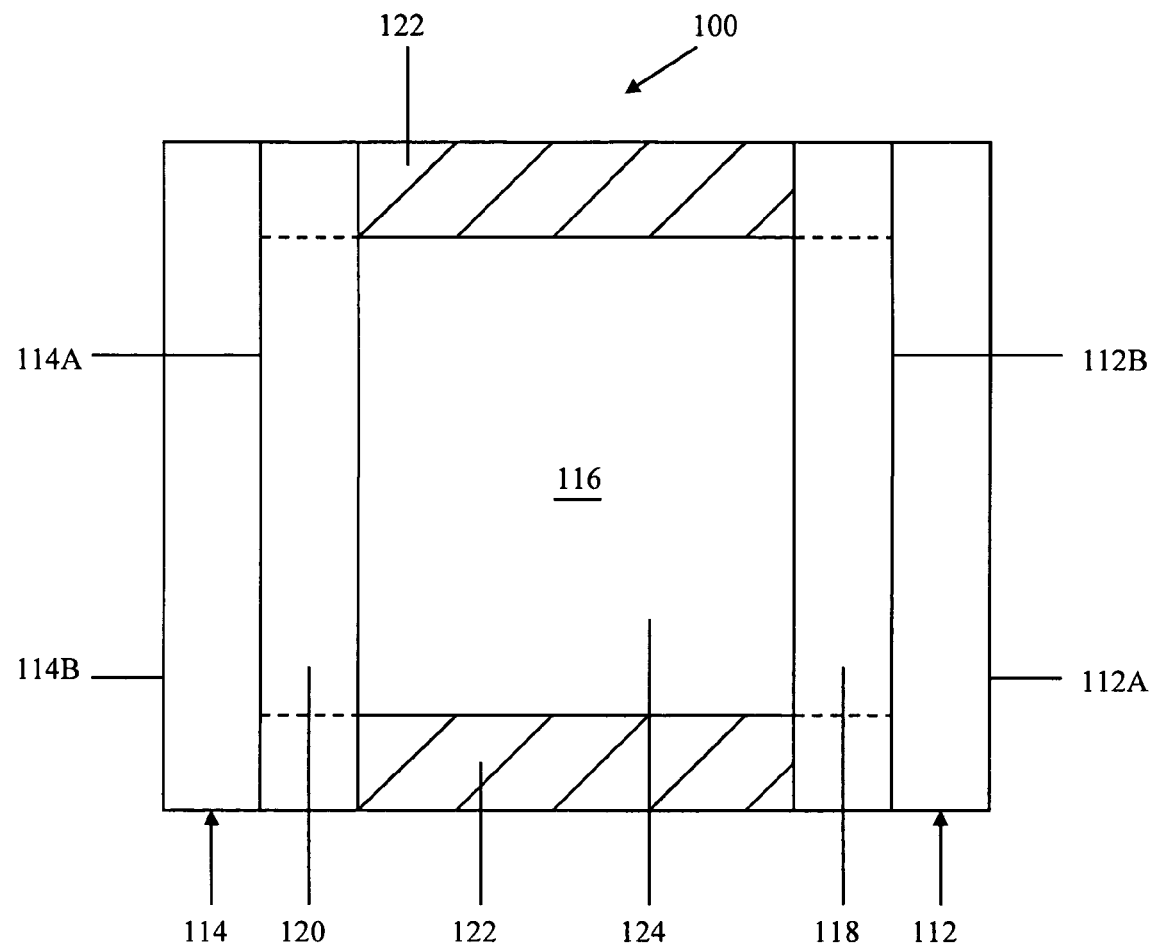
FIG. 1 of the drawings is a cross-sectional schematic representation of an electrochromic device fabricated in accordance with the present invention.

Referring now to the drawings and to FIG. 1 in particular, a cross-sectional schematic representation of electrochromic device 100 is shown, which generally comprises first transparent substrate 112 having front surface 112A and rear surface 112B, second substrate 114 having front surface 114A and rear surface 114B, which may also be transparent, first transparent electrode (i.e. electrically conductive material) 118 associated with rear, inward-facing surface 112B of first transparent substrate 112, second electrode (i.e. electrically conductive material) 120, which may also be transparent, associated with front, inward-facing surface 114A of second substrate 114, and seal 122 provided between the two layered substrates. Substrates 112 and 114 are maintained in a generally parallel spaced-apart manner. Seal 122 serves to provide chamber 116 between substrates 112 and 114 in which electrochromic medium 124 is contained in contact with both electrodes 118 and 120.

It will be understood that electrochromic device 100 may comprise, for illustrative purposes only, a window, a mirror, a display device, and the like. It will be further understood that FIG. 1 is merely a schematic representation of electrochromic device 100. As such, some of the components have been distorted from their actual scale for pictorial clarity. Indeed, numerous other electrochromic device configurations are contemplated for use, including those disclosed in U.S. Pat. No. 5,818,625 entitled "ELECTROCHROMIC REARVIEW MIRROR INCORPORATING A THIRD SURFACE METAL REFLECTOR," and U.S. Pat. No. 6,597,489 entitled "ELECTRODE DESIGN FOR ELECTROCHROMIC DEVICES," both of which are hereby incorporated herein by reference in their entirety.

In accordance with the present invention, electrochromic medium 124 preferably comprises at least one solvent, at least one anodic material, and at least one cathodic material. Typically both of the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference.

Electrochromic medium 124 is preferably chosen from one of the following categories:

Single layer—the electrochromic medium is a single layer of material, which may include small inhomogeneous regions and includes solution-phase devices where a material is contained in solution in the ionically conducting electrolyte and remains in solution in the electrolyte when electrochemically oxidized or reduced. U.S. Pat. No. 6,193,912 entitled "NEAR INFRARED-ABSORBING ELECTROCHROMIC COMPOUNDS AND DEVICES COMPRISING SAME"; U.S. Pat. No. 6,188,505 entitled "COLOR-STABILIZED ELECTROCHROMIC DEVICES"; U.S. Pat. No. 6,262,832 entitled "ANODIC ELECTROCHROMIC MATERIALS HAVING A SOLUBILIZING MOIETY"; U.S. Pat. No. 6,137,620 entitled "ELECTROCHROMIC MEDIA WITH CONCENTRATION-ENHANCED STABILITY, PROCESS FOR PREPARATION THEREOF AND USE IN ELECTROCHROMIC DEVICES"; U.S. Pat. No. 6,195,192 entitled "ELECTROCHROMIC MATERIALS WITH ENHANCED ULTRAVIOLET STABILITY"; U.S. Pat. No. 6,392,783 entitled "SUBSTITUTED METALLOCENES FOR USE AS ANODIC ELECTROCHROMIC MATERIALS, AND ELECTROCHROMIC MEDIA AND DEVICES COMPRISING THE SAME"; and U.S. Pat. No. 6,249,369 entitled "COUPLED ELECTROCHROMIC COMPOUNDS WITH PHOTOSTABLE DICATION OXIDATION STATES" disclose anodic and cathodic materials as well as numerous solvents that may be used in a single layer electrochromic medium, the entire disclosures of which are hereby incorporated herein by reference in their entirety—including the references cited therein. Solution-phase electroactive materials may be contained in the continuous solution phase of a cross-linked polymer matrix in accordance with the teachings of U.S. Pat. No. 5,928,572, entitled "ELECTROCHROMIC LAYER AND DEVICES COMPRISING SAME" or International Patent Application No. PCT/US98/05570 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES," the entire disclosures of which are hereby incorporated herein by reference in their entirety—including the references cited therein.

At least three electroactive materials, at least two of which are electrochromic, can be combined to give a pre-selected color as described in U.S. Pat. No. 6,020,987 entitled "ELECTROCHROMIC MEDIUM CAPABLE OF PRODUCING A PRE-SELECTED COLOR," the entire disclosure of which is incorporated herein by reference. This ability to select the color of the electrochromic medium is particularly advantageous when designing architectural windows.

The anodic and cathodic materials can be combined or linked by a bridging unit as described in International Patent Application No. PCT/WO97/EP498 entitled "ELECTROCHROMIC SYSTEM," the entire disclosure of which is incorporated herein by reference. It is also possible to link anodic materials or cathodic materials by similar methods. The concepts described in these applications can further be combined to yield a variety of electrochromic materials that are linked.

Additionally, a single layer medium includes the medium where the anodic and cathodic materials can be incorporated into the polymer matrix as is described in International Patent Application No. PCT/WO98/EP3862 entitled "ELECTROCHROMIC POLYMER SYSTEM," U.S. Pat. No. 6,002,511, or International Patent Application No. PCT/US98/05570 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES," the entire disclosures of which are hereby incorporated herein by reference in their entirety—including the references cited therein.

Also included is a medium where one or more materials in the medium undergoes a change in phase during the operation of the device, for example, a deposition system where a material contained in solution in the ionically conducting electrolyte which forms a layer or partial layer on the electrically conducting electrode when electrochemically oxidized or reduced.

Multilayer—the medium is made up in layers and includes at least one material attached directly to an electrically conducting electrode or confined in close proximity thereto which remains attached or confined when electrochemically oxidized or reduced. Examples of this type of electrochromic medium are the metal oxide films, such as tungsten oxide, iridium oxide, nickel oxide, and vanadium oxide. A medium, which contains one or more organic electrochromic layers, such as polythiophene, polyaniline, or polypyrrole attached to the electrode, would also be considered a multilayer medium.

It may be desirable to incorporate a gel into the electrochromic device as is disclosed in U.S. Pat. No. 5,940,201 entitled "ELECTROCHROMIC MIRROR WITH TWO THIN GLASS ELEMENTS AND A GELLED ELECTROCHROMIC MEDIUM," the entire disclosure of which is hereby incorporated herein by reference.

In addition, the electrochromic medium may comprise other materials, such as light absorbers, light (UV) stabilizers, thermal stabilizers, antioxidants, thickeners, viscosity modifiers, tint providing agents, redox buffers also referred to as color-stabilizing additives, and mixtures thereof. Suitable UV-stabilizers may include: the material 2-ethyl-2-cyano-3,3-diphenyl acrylate, sold by BASF of Parsippany, N.Y., under the trademark Uvinul N-35 and by Aceto Corp., of Flushing, N.Y., under the trademark Viosorb 910; the material (2-ethylhexyl)-2-cyano-3,3-diphenyl acrylate, sold by BASF under the trademark Uvinul N-539; the material 2-(2'-hydroxy-4'-methylphenyl)benzotriazole, sold by Ciba-Geigy Corp. under the trademark Tinuvin P; the material 3-[3-(2H-benzotriazole-2-yl)-5-(1,1-dimethylethyl)-4-hydroxyphenyl]propionic acid pentyl ester prepared from Tinuvin 213, sold by Ciba-Geigy Corp., via conventional hydrolysis followed by conventional esterification (hereinafter "Tinuvin PE"); the material benzenepropanoic acid, 3-(2H-benzotriazol-2-yl)-5-(1,1-dimethylethyl)-4-hydorxy-, C7-9-branched and linear alkyl esters, sold by Ciba-Geigy Corp., under the trademark Tinuvin 384; the material 2,4-dihydroxybenzophenone sold by, among many others, Aldrich Chemical Co.; the material 2-hydroxy-4-methoxybenzophenone sold by American Cyanamid under the trademark Cyasorb UV 9; and the material 2-ethyl-2'-ethoxyalanilide sold by Sandoz Color & Chemicals under the trademark Sanduvor VSU—to name a few.

For illustrative purposes only, the concentration of the anodic and cathodic materials can range from approximately 1 millimolar (mM) to approximately 500 mM and more preferably from approximately 2 mM to approximately 100 mM. While particular concentrations of the anodic as well as cathodic materials have been provided, it will be understood that the desired concentration may vary greatly depending upon the geometric configuration of the chamber containing electrochromic medium 124.

For purposes of the present disclosure, a solvent of electrochromic medium 124 may comprise any one of a number of common, commercially available solvents including 3-methylsulfolane, dimethyl sulfoxide, dimethyl formamide, tetraglyme and other polyethers; alcohols such as ethoxyethanol; nitrites, such as acetonitrile, glutaronitrile, 3-hydroxypropionitrile, and 2-methylglutaronitrile; ketones including 2-acetylbutyrolactone, and cyclopentanone; cyclic esters including beta-propiolactone, gamma-butyrolactone, and gamma-valerolactone; cyclic carbonates including propylene carbonate (PC), ethylene carbonate; and homogenous mixtures of the same. While specific solvents have been disclosed as being associated with the electrochromic medium, numerous other solvents that would be known to those having ordinary skill in the art having the present disclosure before them are likewise contemplated for use.

Transparent substrate 112 may be any material that is transparent and has sufficient strength to be able to operate in the environmental conditions to which the device will be exposed. Substrate 112 may comprise any type of borosilicate glass, soda lime glass, float glass, or any one of a number of other materials, such as, for example, MYLAR®, polyvinylidene chloride, polyvinylidene halides, such as polyvinylidene fluoride, a polymer or plastic, such as cyclic olefin copolymers like Topas® available from Ticona, LLC of Summitt, N.J., that is transparent in the visible region of the electromagnetic spectrum. Second substrate 114 will also have sufficient strength and be able to operate in the environmental conditions to which the device will be exposed. For use as an EC window substrate 114 will also be transparent and made from the same material as substrate 112. If the device is to be used as a mirror or other device that does not require light to pass through the entire device, substrate 114 may comprise a ceramic or metallic material. It will be understood that first and/or second substrates 112 and 114, respectively, can optionally be tempered, heat strengthened, and/or chemically strengthened, prior to or subsequent to being coated with layers of electrically conductive material (118 and 120). First substrate 112 and second substrate 114 are preferably fabricated from a sheet of glass having a thickness ranging from approximately 0.5 millimeters (mm) to approximately 12.7 mm, and more preferably less than approximately 1.0 mm for certain low weight applications.

Additionally, substrates 112 and 114 may be treated or coated as is described in U.S. Pat. No. 6,239,898 entitled "ELECTROCHROMIC STRUCTURES," U.S. Pat. No. 6,193,378 entitled "ELECTROCHROMIC DEVICE HAVING A SELF-CLEANING HYDROPHILIC COATING," and U.S. patent application Ser. No. 09/602,919 entitled "AN ELECTRO-OPTIC DEVICE HAVING A SELF-CLEANING HYDROPHILIC COATING," the entire disclosures of which are hereby incorporated herein by reference in their entirety. Other treatments, such as anti-reflectance coatings, hydrophilic coatings, low-E coatings, and UV-blocking layers are also contemplated for use in accordance with the present invention. It will be understood that such coatings may be associated with substrates 112 and/or 114 in this as well as other embodiments.

Transparent electrode 118 may be made of any material which bonds well to transparent substrate 112, is resistant to corrosion to any materials within the electrochromic device, is resistant to corrosion by the atmosphere, has minimal diffuse or specular reflectance, high light transmission, near neutral coloration, and good electrical conductance. Transparent electrode 118 comprises, for example, fluorine-doped tin oxide, doped zinc oxide, zinc-doped indium oxide, tin-doped indium oxide (ITO), ITO/metal/ITO (IMI) as is disclosed in "Transparent Conductive Multilayer-Systems for FPD Applications," by J. Stollenwerk, B. Ocker, K. H. Kretschmer of LEYBOLD AG, Alzenau, Germany, the materials described in above-referenced U.S. Pat. No. 5,202,787, such as TEC 20 or TEC 15, available from Libbey Owens-Ford Co. of Toledo, Ohio, or other transparent conductors. Generally, the conductance of transparent electrode 118 will depend on its thickness and composition. IMI generally has superior conductivity compared with the other materials. The thickness of the various layers in the IMI structure may vary, but generally the thickness of the first ITO layer ranges from about 10 Å to about 200 Å, the metal ranges from about 10 Å to about 200 Å, and the second layer of ITO ranges from about 10 Å to about 200 Å. If desired, an optional layer or layers of a color suppression material may be deposited between transparent electrode 118 and inner surface 112B of substrate 112 to suppress the transmission of any unwanted portions of the electromagnetic spectrum. Electrode 120 may comprise many of the same properties as transparent electrode 118, and can be fabricated from the same materials; however, if electrode 120 is not required to be transparent it may be made of metals such as silver, gold, platinum and alloys thereof.

In the particular embodiment shown in FIG. 1, seal 122 may be any material that is capable of adhesively bonding to the inner surfaces of elements 112 and 114 and/or electrodes 118 and 120, to seal the perimeter, such that electrochromic medium 124 does not leak from the chamber defined between the transparent substrates. The seal preferably has good adhesion to glass, metals, metal oxides and other substrate materials; preferably has low permeabilities for oxygen, moisture vapor, and other detrimental vapors and gasses; and must not interact with or poison the electrochromic material it is meant to contain and protect. The seal may be applied in any conventional manner. A preferred seal material and method for applying the seal as well as a preferred method of constructing electrochromic device 100 are described further below.

Electrochromic device 100 further includes a means of providing electrical contact to the electrochromic medium, such as bus clips (not shown) that can be clipped about the perimeter of first and second elements 112 and 114 in such a manner as to physically and electrically contact electrodes 118 and 120 as is disclosed in U.S. Pat. No. 6,407,847, entitled "ELECTROCHROMIC MEDIUM HAVING A COLOR STABILITY," which is hereby incorporated herein by reference in its entirety. Bus clips thus enable electrical current to flow between an external driving circuit through first and second electrodes 118 and 120 and electrochromic medium 124 contained in chamber 116 therebetween. In this manner, the light transmittance of electrochromic device 100 may be varied in response to the electrical control of an external drive circuit. It will be understood that bus clips may be made of any known construction and/or known materials. One possible construction for bus clips is disclosed in U.S. Pat. No. 6,064,509 entitled "CLIP FOR USE WITH TRANSPARENT CONDUCTIVE ELECTRODES IN ELECTROCHROMIC DEVICES" the disclosure of which is hereby incorporated herein by reference in its entirety. Additionally electrical contact may be provided by conventional conductive inks, metal foils, and the like, such as are used in electrochromic mirrors with a metallic ring that is visible around the perimeter of the mirror as is disclosed in U.S. Application Ser. No. 60/614,150, entitled "VEHICULAR REARVIEW MIRROR ELEMENTS AND ASSEMBLIES INCORPORATING THESE ELEMENTS," which is hereby incorporated herein by reference in its entirety.

As was discussed briefly herein above, the present invention is directed to anodic compounds including substituted 5,10-dihydrophenazine compounds and associated derivatives thereof which are useful in solution phase EC devices.

The labeling of 5,10-dihydrophenazines is indicated as follows:

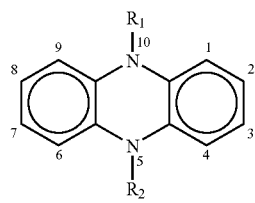

In DMP $R_1$ and $R_2$ are both methyl groups. When a solution of 0.03M DMP and 0.03M octyl viologen tetrafluoroborate in propylene carbonate (PC) is compared with a 0.03M solution of DMP in PC, a broad absorption band is not observed in the solution containing only DMP, whereas a broad absorption band is readily observed in the solution containing both DMP and the viologen ($\Delta A=0.80$ in a 1 cm cell at 749 nm). We have surprisingly found that relatively small, branched alkyl chains on phenazines can significantly reduce this absorbance. Without being bound to any one particular theory, the formation of a donor-acceptor complex between the viologen and phenazine is believed to give rise to the observed absorbance. A similar experiment exhibits that replacing DMP with 5,10-diisopropyl-5,10-dihydrophenazine results in an absorbance of only 0.10 at 674 nm. The compound 2-tert-butyl-5,10-dimethyl-5,10-dihydrophenazine exhibits an absorbance of 0.66 at 768 nm under similar conditions. The reduction in the charge transfer band absorbance leads to EC devices such as mirrors with a greater high end reflectance, and windows with a greater high end transmission.

We have also observed that the smaller isopropyl group attached to the nitrogen is more effective in reducing the charge transfer absorbance than a t-butyl group at the 2 position. We have further observed that substitution at the 1 position by groups even as small as methyl groups also reduced the charge transfer band absorbance.

A reduction in the charge transfer absorbance in phenothiazines has also been observed. Replacing DMP with 10-methylphenothiazine in the previous experiment results in a charge transfer band at 512 nm ($\Delta A=0.055$). When 10-neopentylphenothiazine is used the absorbance at 512 nm is significantly reduced ($\Delta A=0.023$).

When a 10 mM solution of DMP cation radical in propylene carbonate is placed into a cell with two transparent electrodes on glass substrates and sealed with a perimeter epoxy seal, and subsequently tested for one week by applying a sufficient potential to generate the dication at the anode and the neutral DMP at the cathode, the intensity of the absorption bands in the region 435 to 460 nm is reduced to approximately 67% of its initial value. When a similar test is conducted with a solution of the cation radical of 5,10-diethyl-5-10-dihydrophenazine (DEP+) the absorbance in the region 435 to 460 nm is 97% of the initial value. However, when these solutions were subjected to simulated solar irradiation for one week (UV exposure) the DMP cation radical solution retained 89% of its initial absorbance around 460 nm and the DEP cation radical solution retained only 67% of its initial absorbance in the same wavelength region. In addition many of the features of the absorbance spectrum showed considerable change. Chromatographic and mass spectral analysis indicated that the change in the absorption spectrum of the DEP cation radical solution under UV exposure was, in large part, due to the presence of degradation products formed after the extraction of a hydrogen atom from the second carbon from the phenazine nitrogen, or a β hydrogen, from the ethyl group attached to the nitrogen. These results led us to attempt to synthesize compounds that contain no β hydrogens to determine if devices of greater stability could be obtained. We have verified that the use of substituent groups containing no β hydrogen atoms, for example neopentyl, and/or 1-adamantane methyl, improves the long term durability of EC devices over the use of DMP as the anodic component.

Electrochromic devices having as a component part an electrochromic medium as defined herein can be used in a wide variety of applications wherein the transmitted or reflected light can be modulated. Such devices include rearview mirrors for vehicles; windows for the exterior of a building, home or vehicle including aircraft transparencies; skylights for buildings including tubular light filters; windows in office or room partitions; display devices; contrast enhancement filters for displays; and light filters for photographic devices and light sensors—just to name a few.

The invention is further described by the following examples.

EXAMPLE 1

Synthesis of 5,10-bis[(3-triethylammonium) n-propyl]-5,10-dihydrophenazine

A 50 liter reactor, charged with 18.3 kilograms of 1,3-dibromopropane, 9.09 kilograms of triethylamine and 25 liters of acetone, was heated to reflux under a nitrogen atmosphere for 48 hours. The reaction mixture was allowed to cool to room temperature. The white crystalline 1-bromo-3-triethylammonium propane bromide was isolated via vacuum filtration, and rinsed 2 times with 10 liters of acetone to remove any residual starting materials. The compound was dried in a vacuum oven at approximately 50 degrees centigrade for 8 hours.

18.4 kilograms of 1-bromo-3-triethylammonium propane bromide was transferred to a 100 liter reactor, along with 3.2 kilograms of sodium dithionite, 3.0 kilograms of sodium carbonate hydrate, 2.16 kilograms of phenazine, 0.61 kilograms of methyl tri-butyl ammonium chloride, 0.36 kilograms of sodium iodide, 25 liters of acetonitrile and 2.5 liters of water. The reaction mixture was stirred and heated to reflux under a nitrogen atmosphere for 72 hours. The reaction mixture was then allowed to cool to room temperature. 25 liters of water was added to the cooled solution and the acetonitrile was then distilled off. Next, 18.75 liters of methanol was added and the mixture was transferred to a clean 100 liter reactor through a pall filter. 1 liter of triethylamine and 12 liters of 40% sodium tetrafluoroborate solution were added to the mixture. The solution was stirred at room temperature for 8 hours.

The yellow tetrafluoroborate salt was then filtered off and rinsed 2 times with 10 liters of deionized water. The salt was added to a clean 100 liter reactor and 17.5 liters of methanol, 14 liters of water, 6 liters of 40% sodium tetrafluoroborate solution and 1 liter of triethylamine was added to the mixture which was heated to reflux to dissolve the solids. The heat was then shut off and the mixture was allowed to cool to room temperature. The mixture was then stirred at room temperature 4 hours before filtering.

A yellow to light green-colored crystalline solid was filtered off and rinsed two times with 10 liters of deionized water. The product was recrystallized a second time in a clean 100 liter reactor by charging the once-recrystallized product, 17.5 liters of methanol, 17 liters of water, 3.0 liters of 40% sodium tetrafluoroborate solution and 1 liter of triethylamine, which was heated to reflux and subsequently cooled to room temperature. The mixture was then stirred at room temperature for 4 hours.

A yellow to light green-colored crystalline solid was filtered off and rinsed two times with 10 liters of deionized water. The product was recrystallized a third time in a clean 100 liter reactor by charging the twice-recrystallized product, 17.5 liters of methanol, 17 liters of water, 3.0 liters of 40% sodium tetrafluoroborate solution and 1 liter of triethylamine, which was heated to reflux and subsequently cooled to room temperature. The mixture was then stirred at room temperature for 4 hours, and the product was vacuum filtered, rinsed 2 times with 10 liters of deionized water and then with 10 liters of ethanol. The product, 5,10-bis[(3-triethylammonium) n-propyl]-5,10-dihydrophenazine, was dried in a vacuum oven at approximately 70 degrees centigrade for 8 hours.

EXAMPLE 2

Synthesis of
5,10-dineopentyl-5,10-dihydrophenazine

A 5 liter 3-neck round-bottom flask was charged with 90 grams of phenazine and dissolved in 2 liters of acetonitrile. The mixture was stirred and heated to a mild reflux under a nitrogen atmosphere. 110 grams of sodium dithionite was dissolved in 200 milliliters of water. An aqueous solution of sodium dithionite was added via a liquid addition funnel over ½ of an hour, and refluxed for 2 hours. The heat was turned off and 2 liters of water was dripped in over 15 minutes. The mixture was allowed to cool to room temperature and vacuum filtered off a white solid (5,10-dihydrophenazine). The compound was washed with 100 milliliters of water and then immediately dried in a vacuum oven at 70 degrees centigrade for 4 hours or until dry.

A 5 liter 3-neck round-bottom flask, charged with 150 grams of dry 5,10-dihydrophenazine and 1.0 liter of pyridine was stirred to dissolve the solids at room temperature under a nitrogen atmosphere. 218.5 grams of pivaloyl chloride was dripped in over ½ of an hour via a liquid addition funnel. The mixture was heated and refluxed overnight. The heat was removed and 1.5 liters of water was dripped in, while stirring, over ½ of an hour. The mixture was cooled to room temperature and the solid that had precipitated was vacuum filtered off. The solid was washed with 1 liter of water and dried in a vacuum oven at 70 degrees centigrade until completely dry. The 164.2 grams of 5,10 pivaloyl phenazine obtained was recrystallized by dissolving the solid in 500 milliliters of hot ethanol. The solution was cooled to approximately 0 degrees centigrade for 4 hours and then the recrystallized product was filtered and washed with 100 milliliters of ethanol and was dried, yielding to 140.9 grams of 5,10-pivaloyl phenazine.

140.9 grams of 5,10-pivaloyl phenazine was charged to a 5 liter 3-neck round-bottom flask and dissolved in 2 liters of dry tetrahydrofuran (THF) by stirring under a nitrogen atmosphere at room temperature. Next, 1.006 liters of 1.0 M borane in THF was added via liquid addition funnel over one hour. The solution was heated and refluxed overnight. The next day the solution was cooled to room temperature and 50 milliliters of ethanol was slowly dripped in to quench the excess borane. The reaction solution was concentrated down to about 250 milliliters total volume, then 250 milliliters of ethanol was added. The THF was removed and the mixture was cooled to approximately 0 degrees centigrade for 4 hours. The 5,10-dineopentyl-5,10-dihydrophenazine was isolated via vacuum filtration and washed with cold ethanol. Impurities were removed via 3 recrystallizations in 300 milliliters of ethanol.

EXAMPLE 3

Additional Synthesis of
5,10-dineopentyl-5,10-dihydrophenazine 5,10-dineopentyl-5,10-dihydrophenazine can also be prepared using the following three step synthesis. In the first step phenazine is reduced to 5,10-dihydrophenazine with sodium dithionite. The procedure used is as follows: To a 5 liter 3-neck round-bottom flask charge 90 grams of phenazine, 110 grams of sodium dithionite, 1 liter of water and 2 liters of acetonitrile. Stir and heat to a mild reflux under a nitrogen atmosphere. Reflux for at least 3 hours, then turn off the heat and drip in 3 liters of water over 15 minutes. Cool to 50 degrees centigrade or less and with a filter candle, remove most of the solvents. Add 500 milliliters of water and stir for approximately 10 minutes. With a filter candle remove most of the water. Again add 500 milliliters of water, stir for 10 minutes, and remove most of the water with a filter candle. Add 1.2 liters of toluene and heat to reflux. Distill off 350 milliliters of toluene to dry the 5,10-dihydrophenazine.

The next step involves acylation of the nitrogens with trimethyl acetyl chloride. To the 5 liter 3-neck round-bottom flask containing the dried 5,10-dihydrophenazine in toluene, add 3.0 grams of para-dimethyl amino pyridine, 300 grams of trimethyl acetyl chloride, and 300 grams of triethyl amine. Heat to reflux and maintain the reflux for at least 10 hours. Turn off the heat and cool the reaction mixture to 30 degrees centigrade or less. Slowly add 50 milliliters of water over ½ hour and then stir for 15 minutes. Turn off the stirrer, then cut off and discard the lower aqueous layer. Add 380 milliliters of water and 120 milliliters of 50% sodium hydroxide solution. Stir for at least 2 hours, then cut and discard the lower aqueous layer. Add 250 milliliters of water and stir for 15 minutes. Cut and discard the lower aqueous layer. Next, dry the diamide solution by distilling off 150 milliliters of the toluene reaction solvent.

The third and final step is a reduction of the amide functionalities to the corresponding tertiary amines with borane. Charge 1.050 liters of 1.0 M borane: THF complex in THF to a 5 liter reaction flask. Cool the borane solution to approximately 10 degrees centigrade and then add the diamide toluene solution to the borane solution over a 2 hour period. Maintain the temperature of the reaction solution between approximately 10 and 20 degrees centigrade during addition. After the addition is complete, stir for 1 hour at approximately 20 degrees centigrade and then increase the heat to between about 40 and 50 degrees centigrade. Stir for a minimum of 8 hours at this temperature.

Quench the reduction reaction, by slowly adding 3 milliliters of water over a period of ½ hour, then add 50 milliliters quickly there after. Heat to approximately 55 degrees centigrade and stir for at least 15 minutes. Cut off and discard the lower aqueous layer. Add another 500 milliliters of water and stir for at least 15 minutes at approximately 55 degrees centigrade. Cut off and discard the lower aqueous layer. Heat to reflux, and then distill off the THF and toluene solvents until the reaction temperature reaches approximately 125 degrees centigrade. Cool to approximately 70 degrees centigrade and add 325 milliliters of ethanol, followed by 200 milliliters of acetone. Add 25 grams of acidified polymer resin, UBK510L from Sorbent Technologies. Heat to reflux for at least 4 hours, then transfer to a clean 1 liter flask via a filter candle. Heat the reaction solution to reflux and distill off 300 milliliters of solvent. Gradually cool the reaction solution to approximately 10 degrees centigrade and hold for at least 2 hours.

Filter off the desired product over a Buchner funnel and wash with 150 ml of cold ethanol. Dry at approximately 70 degrees centigrade for 4 hours yielding white crystalline 5,10-dineopentyl-5,10-dihydrophenazine.

EXAMPLE 4

Synthesis of 5,10-(1-adamantane methyl)-5,10-dihydrophenazine 5,10-(1-adamantane methyl)-5,10-dihydrophenazine was obtained by a 3-step process very similar to the synthesis of 5,10-dineopentyl-5,10-dihydrophenazine described in Example 2. 5,10-dihydrophenazine was obtained in the same manner as described in Example 2.

Adamantane carbonyl chloride, available from Aldrich Corporation, was added to a 3-neck round-bottom 1 liter flask with 20.8 grams of 5,10-dihydrophenazine and 300 milliliters of pyridine. The mixture was stirred and heated under a nitrogen atmosphere to 50 degrees centigrade. With a solid addition funnel, the adamantane carbonyl chloride was charged over 10 minutes. This reaction mixture was then heated to reflux for 16 hours. The heat was shut off and 300 milliliters of water was added over 30 minutes. The desired diamide precipitated and the supernatant was discarded. The precipitate was dissolved in 400 milliliters of hot methanol and then allowed to crystallize at 0 degrees centigrade for 16 hours.

The recrystallized diamide was vacuum filtered and washed with ethanol which was then dried at 70 degrees centigrade for 16 hours. Dry weight of the diamide, which was contaminated with a small amount of phenazine, was 26.2 grams. This solid was charged to a 3-neck round-bottom 1 liter flask and was dissolved in 500 milliliters of tetrahydrofuran (THF). To this solution was added 130 milliliters of 1.0 M borane-THF complex in THF over 45 minutes. This reaction mixture was then heated to 50 degrees centigrade overnight.

The reaction mixture was cooled to room temperature and quenched with slow addition of ethanol. Over the next hour, 250 ml of ethanol was added and the solution was cooled to 0 degrees centigrade. After 4 hours, the crystallized 5,10-(1-adamantane methyl)-5,10-dihydrophenazine was filtered off as an off-white colored crystal with a dry weight of 7.1 grams.

EXAMPLE 5

Synthesis of 2,7-dineopentyl-5,10-dimethyl-5,10-dihydrophenazine 2,7-dineopentyl-5,10-dimethyl-5,10-dihydrophenazine can be prepared using a two step synthesis wherein 5,10-dimethyl-5,10-dihydrophenazine is used as the starting material. The first step is a Friedel-Crafts di-acylation at the 2 position, and likely, the 7 position. However, the material has not been characterized completely so other possibilities do exist, such as, di-acylation at the 2,6 positions, 2,8 positions, and 2,9 positions. It is also possible that the reaction could form a mixture of isomers, but we will refer to it as the 2,7 isomer in this example. 21.0 grams of 5,10-dimethyl-5,10-dihydrophenazine, 4.1 grams of zinc chloride, 36.2 grams of trimethyl acetyl chloride, 55.6 grams of 1,1'-dioctyl-4,4'-dipyridinium bis-tetrafluoroborate, and 500 milliliters of dichloroethane are charged to a 1 liter reaction flask and heated to a gentle reflux under a nitrogen atmosphere. The reaction mixture is refluxed for 16 hours, then cooled to room temperature and filtered over silica gel to remove the zinc chloride and dipyridinium salts. The filtrates are concentrated to remove all of the dichloroethane. Next, 200 milliliters of ethanol is added and stirred at 70 degrees centigrade to dissolve, and then 95 milliliters of ethanol is distilled off and allowed to gradually cool to room temperature. The solution is allowed to crystallize for 16 hours at room temperature, then the orange, crystalline 2,7-trimethyl acetyl-5,10-dimethyl-5,10-dihydrophenazine is filtered off and washed with 50 milliliters of cold ethanol. Next, the material is dried in a vacuum oven at approximately 70 degrees centigrade for 4 hours to yield 28.1 grams of desired product for a 74.3% yield.

The second step is a Wolff-Kishner reduction of the ketone groups to alkanes; forming neopentyl groups from the trimethyl acetyl groups. 27.1 grams of 2,7-trimethyl acetyl-5,10-dimethyl-5,10-dihydrophenazine, 21.5 grams of hydrazine hydrate, 48.2 grams of potassium tert-butoxide and 500 milliliters of toluene is charged to a 2 liter reaction flask. The mixture is refluxed for 72 hours, cooled to room temperature, and then transferred to a 2 liter separatory funnel. Next, 2 water washes of 500 milliliters each on the toluene reaction mixture is performed and the aqueous layers are discarded. The remaining toluene solution is concentrated to dryness and then dissolved in 100 milliliters of acetone and 100 milliliters of ethanol. The material is then heated to reflux and the 100 milliliters of solvent is distilled off atmospherically. Next, the solution is gradually cooled to approximately 5 degrees centigrade for 2 hours. The desired product, 2,7-dineopentyl-5,10-dimethyl-5,10-dihydrophenazine, is filtered off, and washed with 50 milliliters of cold ethanol. The product is dried in a vacuum oven for 4 hours at approximately 70 degrees centigrade, yielding 13.5 grams of an off-white crystalline product.

EXAMPLE 6

Synthesis of 2,5,7,10-tetraneopentyl-5,10-dihydrophenazine 2,5,7,10-tetraneopentyl-5,10-dihydrophenazine can be prepared using a two step synthesis wherein 5,10-dineopentyl-5,10-dihydrophenazine is used as the starting material. The first step is a Friedel-Crafts di-acylation at the 2 position, and likely, the 7 position. However, the material has not been characterized completely so other possibilities do exist, such as, di-acylation at the 2,6 positions, 2,8 positions, and 2,9 positions. It is also possible that the reaction could form a mixture of isomers, but we will refer to it as the 2,7 isomer in this example. 25.6 grams of 5,10-dineopentyl-5,10-dihydrophenazine, 3.4 grams of zinc chloride, 25.6 grams of trimethyl acetyl chloride, 44.8 grams of 1,1'-dioctyl-4,4'-dipyridinium bis-tetraflouroborate, and 250 milliliters of dichloroethane are charged to a 1 liter reaction flask and heated to a gentle reflux for 16 hours, then cooled to room temperature and filtered over silica gel to remove the zinc chloride and dipyridinium salts. The filtrates are concentrated to remove all of the dichloroethane. Next, 200 milliliters of ethanol is added and the mixture is stirred at 70 degrees centigrade to dissolve the salts. The solution is then allowed to gradually cool to 5 degrees centigrade which is maintained for 16 hours. The light orange, crystalline 2,7-di-(trimethylacetyl)-5,10-dineopentyl-5,10-dihydrophenazine is filtered off and washed with 50 milliliters of cold ethanol. The solids are then dried in a vacuum oven at 70 centigrade for 4 hours to produce 20.5 grams of desired product. The filtrates are then concentrated to 50 milliliters and cooled at 5 degrees centigrade for 2 hours. A second crop of 7.9 grams was recovered.

The second step is a Wolff-Kishner reduction of the trimethyl acetyl groups to neopentyl groups. 18.4 grams of 2,7- di-(trimethylacetyl)-5,10-dineopentyl-5,10-dihydrophenazine, 9.4 grams of hydrazine hydrate, 25.2 grams of potassium tert-butoxide and 300 milliliters of toluene are charged to a 500 milliliter reaction flask. Next, the reaction mixture is refluxed for 72 hours and an additional 5.0 grams of potassium tert-butoxide is charged to the mixture. The mixture is then refluxed for an additional 72 hours and then cooled to 50 degrees centigrade. The reaction mixture is then transferred to a separatory funnel and 2 water washes of 100 milliliters each are performed. The remaining toluene solution is then concentrated to dryness and then redissolved in 300 milliliters of warm acetone. 50 ml of ethanol is added and then 300 milliliters of solvent is distilled off atmospherically. The reaction solution is then allowed to cool to room temperature and held for 2 hours. The desired product, 2,5,7,10-tetraneopentyl-5,10-dihydrophenazine was filtered off and washed with 50 milliliters of cold ethanol. The product was dried in a vacuum oven for 4 hours at 70 degrees centigrade, yielding 9.4 grams of an off-white crystalline product.

EXAMPLE 7

A solution of 0.03M DMP in PC was placed in a 1 cm cuvette and the absorption spectrum was measured from 1200 nm to 350 nm on a Shimadzu 3105 UV-VIS-NIR spectrometer with room air as a reference. Then, a 0.03M solution of DMP and 0.03M octyl viologen in PC was measured in the same way. The difference between the two spectra was taken as a measure of the charge transfer band absorbance. The maximum absorbance of 0.798 between 1200 and 500 nm was recorded at 749 nm.

Similar solutions of 2-t-butyl-5,10-dimethyl-5,10-dihydrophenazine, 5,10-diisopropyl-5,10-dihydrophenazine, 5,10-dineopentyl-5,10-dihydrophenazine and 5,10-bis[(3-triethylammonium)n-propyl], and 5,10-dimethyl-5,10-dihydrophenazine with octyl viologen were prepared and the spectra recorded. The maximum wavelength and absorbance are presented in Table 1.

TABLE 1

| Compound | $\lambda_{max}$ (nm) | Abs. |
|---|---|---|
| 5,10-dimethyl-5,10-dihydrophenazine | 749 | .798 |
| 2-t-butyl-5,10-dimethyl-5,10-dihydrophenazine | 768 | .656 |
| 5,10-diisopropyl-5,10-dihydrophenazine | 673.5 | .100 |
| 5,10-dineopentyl-5,10-dihydrophenazine | 736.5 | .199 |
| 5,10-bis(3-triethylammonium n-propyl)-5,10-dihydrophenazine | 800 | .143 |

In an attempt to eliminate any ambiguity associated with the nomenclature of the compounds identified herein, structures of the same are provided herein below:

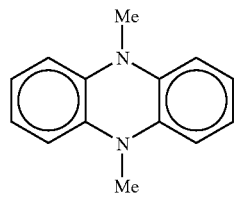

5,10-dimethyl-5,10-dihydrophenazine

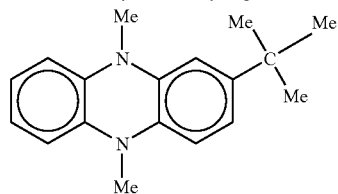

2-t-butyl-5,10-dihydrophenazine

-continued

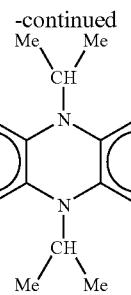

5,10-diisopropyl-5,10-dihydrophenazine

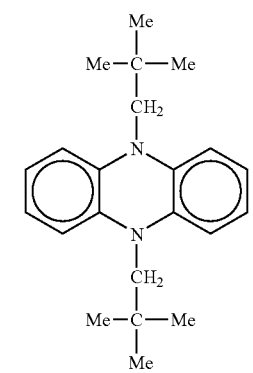

5,10-dineopentyl-5,10-dihydrophenazine

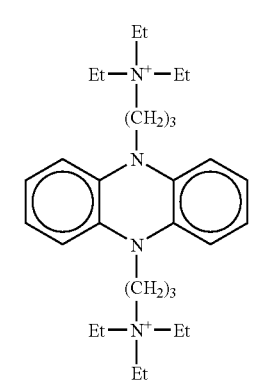

5,10-bis[(3-triethylammoniumn)n-propyl]-5,10-dihydrophenazine

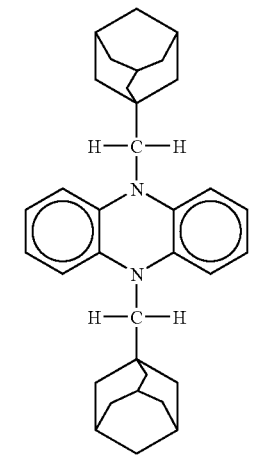

5,10-(1-adamantane methyl)-5,10-dihydrophenazine

-continued

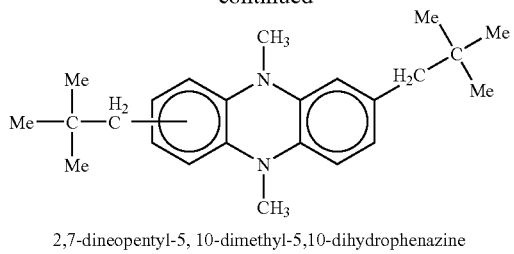

2,7-dineopentyl-5, 10-dimethyl-5,10-dihydrophenazine

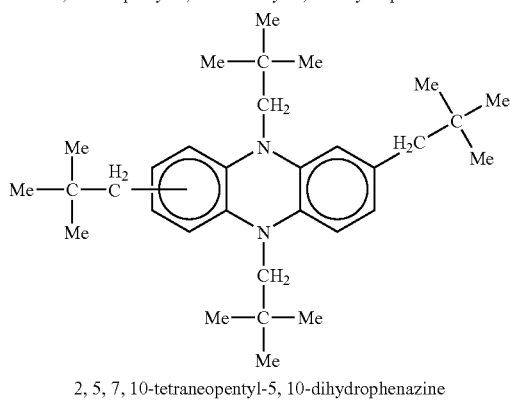

2, 5, 7, 10-tetraneopentyl-5, 10-dihydrophenazine

EXAMPLE 8

Electrochromic windows were prepared by placing two 2 inch by 5 inch pieces of glass coated on one side with ITO and aligning the ITO coated surfaces facing each other in a spaced apart relationship via an epoxy seal containing spacers of 250 microns and curing the seal to form a cavity. A solution of 0.015 M 5,10-dimethyl-5,10-dihydrophenazine, 0.021 M methyl viologen and 0.0005M each octamethyl methylhexanoate ferrocene and octamethyl methylhexanoate ferroceninium tetrafluoroborate in PC (solution 1) was introduced into the cavity of the window. To a similar window a solution of 0.015 M 5,10-dineopentyl, 5,10-dihydrophenazine, 0.021 M methyl viologen and 0.0005M each octamethyl methylhexanoate ferrocene and octamethyl methylhexanoate ferrocinium tetrafluoroborate in PC (solution 2) was introduced. The windows were subjected to a variety of durability tests while cycling between the high transmission and low transmission state by the intermittent application of a potential of 1.2V, as follows: exposure to high temperature (85° C.) for over 8,000 hours and exposure to simulated sunlight (Atlas Weather-Ometer operated at 0.55W/m² at 340 nm, also referred to as "1 sun" and 1.1W/m² at 340 nm, "2 sun") for over 4,000 hours.

The following table lists the color changes (defined as $\Delta E=(\Delta L^{*2}+\Delta a^{*2}+\Delta b^{*2})^{1/2}$) for the solutions in durability testing.

TABLE 2

| Approximate Time (hours) | (ΔE VALUES) | | | | | |
|---|---|---|---|---|---|---|
| | 85° C. Cycling | | 1 Sun Cycling | | 2 Sun Cycling | |
| | Solution 1 | Solution 2 | Solution 1 | Solution 2 | Solution 1 | Solution 2 |
| 1,000 | — | — | — | — | 5.39 | 4.94 |
| 2,000 | 4.15 | 3.66 | 6.28 | 5.55 | 12.93 | 11.49 |
| 4,000 | 7.97 | 3.84 | 14.20 | 13.56 | — | — |
| 6,000 | 13.57 | 9.02 | — | — | — | — |
| 8,000 | 18.12 | 11.09 | — | — | — | — |

EXAMPLE 9

Two 2 inch by 5 inch windows were prepared with a perimeter epoxy seal and a cell spacing of 250 microns with ITO transparent electrodes. One of the windows was filled with 0.010 M DMP cation radical in PC and the other window was filled with 0.01 M 5,10-dineopentyl-5,10-dihydrophenazine (NPP) in PC; the absorbance spectrum of both windows was measured. We found that the NPP cation radical showed a significantly broader absorbance band around 460 nm ($\lambda_{max}$=465 run, fwhm=74 nm compared to DMP cation radical $\lambda_{max}$=461 nm, fwhm=58 nm).

While the invention has been described in detail herein in accordance with certain preferred embodiments thereof, many modifications and changes therein may be effected by those skilled in the art. Accordingly, it is our intent to be limited only by the scope of the appending claims and not by way of details and instrumentalities describing the embodiments shown herein.

What is claimed is:

1. An electrochromic device, comprising:
   a first substantially transparent substrate having an electrically conductive material associated therewith;
   a second substrate having an electrically conductive material associated therewith; and
   an electrochromic medium comprising:
      at least one solvent;
      at least one anodic electroactive material;
      at least one cathodic electroactive material;
      wherein at least one of the anodic and cathodic electroactive materials is electrochromic; and
      wherein at least one anodic electroactive material is represented by the following formula:

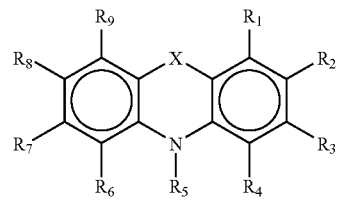

wherein X comprises N—R₁₀, O, or S; wherein $R_1$-$R_{10}$ are the same or different and comprise H, an alkyl, cycloalkyl, polycycloalkyl, heterocycloalkyl, aryl, alkaryl, aralkyl, alkoxy, alkenyl, and/or alkynyl group containing approximately 1 to approximately 50 carbon atom(s) and/or a silyl or siloxyl group containing approximately 1 to approximately 50 silicon atom(s), wherein the carbon and/or silicon atom(s) can be a linking group to, or part of, a halogen, a N, O, and/or S containing moiety, and/or one or more functional groups comprising alcohols, esters, ammonium salts, phosphonium salts, and combinations thereof; with the proviso that at least one of $R_5$ and $R_{10}$ comprises an alkyl, cycloalkyl, polycycloalkyl, heterocycloalkyl, aryl, alkaryl, aralkyl, alkoxy, alkenyl, and/or alkynyl group containing 4 to approximately 50 carbon atoms, wherein at least one of the carbon atoms can be a linking group to, or part of, a halogen, a N, O, and/or S containing moiety, and/or one or more functional groups comprising alcohols, esters, ammonium salts, phosphonium salts, and combinations thereof, and wherein at least one of $R_5$ and $R_{10}$ is void of any β hydrogen atoms.

2. An electrochromic medium for use in an electrochromic device, comprising:
   at least one solvent;
   at least one anodic electroactive material;
   at least one cathodic electroactive material;
   wherein at least one of the anodic and cathodic electroactive materials is electrochromic; and
   wherein at least one anodic electroactive material is represented by the following formula:

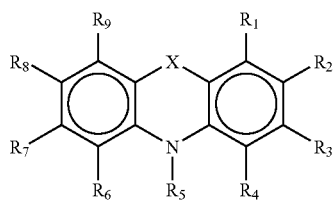

wherein X comprises N—$R_{10}$, O, or S; wherein $R_1$-$R_{10}$ are the same or different and comprise H, an alkyl, cycloalkyl, polycycloalkyl, heterocycloalkyl, aryl, alkaryl, aralkyl, alkoxy, alkenyl, and/or alkynyl group containing approximately 1 to approximately 50 carbon atom(s) and/or a silyl or siloxyl group containing approximately 1 to approximately 50 silicon atom(s), wherein the carbon and/or silicon atom(s) can be a linking group to, or part of, a halogen, a N, O, and/or S containing moiety, and/or one or more functional groups comprising alcohols, esters, ammonium salts, phosphonium salts, and combinations thereof; with the proviso that at least one of $R_5$ and $R_{10}$ comprises an alkyl, cycloalkyl, polycycloalkyl, heterocycloalkyl, aryl, alkaryl, aralkyl, alkoxy, alkenyl, and/or alkynyl group containing 4 to approximately 50 carbon atoms, wherein at least one of the carbon atoms can be a linking group to, or part of, a halogen, a N, O, and/or S containing moiety, and/or one or more functional groups comprising alcohols, esters, ammonium salts, phosphonium salts, and combinations thereof, and wherein at least one of $R_5$ and $R_{10}$ is void of any β hydrogen atoms.

3. The electrochromic medium according to claim 2, wherein X comprises N—$R_{10}$; wherein $R_1$-$R_{10}$ are the same or different and comprise H, an alkyl, cycloalkyl, polycycloalkyl, heterocycloalkyl, aryl, alkaryl, aralkyl, alkoxy, alkenyl, and/or alkynyl group containing approximately 1 to approximately 50 carbon atom(s) and/or a silyl or siloxyl group containing approximately 1 to approximately 50 silicon atom(s), wherein the carbon and/or silicon atom(s) can be a linking group to, or part of, a halogen, a N, O, and/or S containing moiety, and/or one or more functional groups comprising alcohols, esters, ammonium salts, phosphonium salts, and combinations thereof; with the proviso that both $R_5$ and $R_{10}$ comprise an alkyl, cycloalkyl, polycycloalkyl, heterocycloalkyl, aryl, alkaryl, aralkyl, alkoxy, alkenyl, and/or alkynyl group containing 4 to approximately 50 carbon atoms, wherein at least one of the carbon atoms can be a linking group to, or part of, a halogen, a N, O, and/or S containing moiety, and/or one or more functional groups comprising alcohols, esters, ammonium salts, phosphonium salts, and combinations thereof, and wherein both of $R_5$ and $R_{10}$ are void of any β hydrogen atoms.

4. The electrochromic medium according to claim 2, wherein at least one of $R_5$ and $R_{10}$ comprises an alkyl group containing approximately 5 to approximately 20 carbon atoms.

5. An electrochromic device, comprising:
   a first substantially transparent substrate having an electrically conductive material associated therewith;
   a second substrate having an electrically conductive material associated therewith; and
   an electrochromic medium according to claim 4 contained within a chamber positioned between the first and second substrates.

6. The electrochromic medium according to claim 2, wherein $R_5$ and $R_{10}$ comprise alkyl groups containing approximately 5 to approximately 20 carbon atoms.

7. The electrochromic medium according to claim 2, wherein at least one of $R_5$ and $R_{10}$ comprises a neopentyl group.

8. An electrochromic device, comprising:
   a first substantially transparent substrate having an electrically conductive material associated therewith;
   a second substrate having an electrically conductive material associated therewith; and
   an electrochromic medium according to claim 7 contained within a chamber positioned between the first and second substrates.

9. The electrochromic medium according to claim 2, wherein $R_5$ and $R_{10}$ comprise neopentyl groups.

10. The electrochromic medium according to claim 2, wherein $R_5$ and $R_{10}$ consist of neopentyl groups.

11. An electrochromic device, comprising:
    at least one substrate having an electrically conductive material associated therewith; and
    the electrochromic medium according to claim 10.

12. An electrochromic device, comprising:
    a first substantially transparent substrate having an electrically conductive material associated therewith;
    a second substrate having an electrically conductive material associated therewith; and
    an electrochromic medium according to claim 10 contained within a chamber positioned between the first and second substrates.

13. The electrochromic medium according to claim 2, wherein $R_1$-$R_{10}$ are void of a benzyl group.

14. The electrochromic medium according to claim 2, wherein $R_5$ and $R_{10}$ are void of a benzyl group.

15. The electrochromic medium according to claim 2, wherein the electrochromic medium further comprises at least one of a cross-linked polymer matrix, a free-standing gel, and a substantially non-weeping gel.

16. An electrochromic device, comprising:
    at least one substrate having an electrically conductive material associated therewith; and
    the electrochromic medium according to claim 2.

17. The electrochromic device according to claim 16, wherein the device comprises an electrochromic window.

18. The electrochromic device according to claim 16, wherein a substrate is coated with a reflective material.

19. The electrochromic device according to claim 18, wherein the device comprises an electrochromic mirror.

20. The electrochromic device according to claim 19, wherein the device comprises a metallic ring around a perimeter.

21. The electrochromic device according to claim 16, wherein a substrate is less than approximately 1.0 mm thick.

22. The electrochromic device according to claim 17, where the device is an aircraft transparency.

23. The electrochromic device according to claim 16, wherein a substrate comprises a hydrophilic coating.

24. The electrochromic device according to claim 16, wherein the device exhibits a reduced charge transfer band in a solution with a viologen compared to 5,10-dimethyl-5,10-dihydrophenazine.

25. An electrochromic medium for use in an electrochromic device, comprising: at least one solvent; at least one anodic electroactive material; at least one cathodic electroactive material; wherein the at least one anodic electroactive material comprises a 5,10-dialkyl-5,10-dihydrophenazine compound, wherein at least one alkyl group attached to the phenazine compound comprises at least 4 carbon atoms and is void of any β hydrogen atoms.

* * * * *